United States Patent
Boban et al.

(10) Patent No.: US 11,516,626 B2
(45) Date of Patent: Nov. 29, 2022

(54) TECHNIQUES FOR GROUP-BASED FEEDBACK FOR GROUPCAST TRANSMISSION IN COMMUNICATION SYSTEMS

(71) Applicant: Huawei Technologies Co., Ltd., Shenzhen (CN)

(72) Inventors: Mate Boban, Munich (DE); Richard Stirling-Gallacher, Munich (DE); Martin Schubert, Munich (DE); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/188,777

(22) Filed: Mar. 1, 2021

(65) Prior Publication Data
US 2021/0258743 A1    Aug. 19, 2021

Related U.S. Application Data

(63) Continuation of application No. PCT/EP2018/073395, filed on Aug. 30, 2018.

(51) Int. Cl.
*H04W 4/08* (2009.01)
*H04W 4/40* (2018.01)
(Continued)

(52) U.S. Cl.
CPC ............... *H04W 4/08* (2013.01); *G08G 1/22* (2013.01); *H04W 4/40* (2018.02); *H04W 24/08* (2013.01); *H04W 92/18* (2013.01)

(58) Field of Classification Search
CPC .. H04B 7/0626; H04B 7/0456; H04B 7/0639; H04B 7/0617; H04B 7/0632; H04B 7/0695; H04B 7/024; H04B 7/0417; H04B 7/0478; H04B 7/06; H04B 7/0452; H04B 7/0486; H04B 7/063; H04B 7/088;
(Continued)

(56) References Cited

U.S. PATENT DOCUMENTS 7,747,285 B2   6/2010  Lozano
8,787,375 B2   7/2014  Liu et al.
(Continued)

FOREIGN PATENT DOCUMENTS

EP    3079382 A1 * 10/2016 ............ H04W 24/10
EP    3079382 A1   10/2016
(Continued)

*Primary Examiner* — Golam Sorowar
(74) *Attorney, Agent, or Firm* — Leydig, Voit & Mayer, Ltd.

(57) ABSTRACT

A base station is configured to: configure a transmission group including at least two User Equipments (UEs), and transmit a signal to at least one of UEs in the transmission group. The signal includes information about a feedback to be received from at least one of the UEs in the transmission group. The feedback includes information about the UEs in the transmission group. A UE is configured to: receive a signal from a base station, in particular a gNB. The signal includes information about a feedback to be reported to the base station from at least one of the UE or another UE in a transmission group configured by the base station. The transmission group includes at least two UEs.

17 Claims, 9 Drawing Sheets

(51) Int. Cl.
    *G08G 1/00* (2006.01)
    *H04W 24/08* (2009.01)
    *H04W 92/18* (2009.01)

(58) Field of Classification Search
    CPC .... H04B 7/0619; H04B 17/24; H04B 7/0408;
    H04B 7/065; H04B 7/0482; H04B
    7/0469; H04B 7/0691; H04B 17/336;
    H04B 17/318; H04B 7/0413; H04B
    17/309; H04B 17/327; H04B 7/04; H04B
    7/10; H04B 17/345; H04B 7/0634; H04B
    7/0647; H04B 7/0628; H04B 7/022;
    H04B 7/0404; H04B 7/043; H04B
    7/0636; H04B 7/0658; H04B 7/066;
    H04B 7/084; H04L 5/0048; H04L 5/0057;
    H04L 5/0023; H04L 5/005; H04L 1/0026;
    H04L 5/0053; H04L 5/0051; H04L
    5/0094; H04L 5/0035; H04L 5/0007;
    H04L 5/0091; H04L 5/001; H04L 5/0044;
    H04L 5/006; H04L 1/0003; H04L 1/0009;
    H04L 1/0027; H04L 5/0055; H04L 1/08;
    H04L 25/0224; H04L 5/0037; H04L
    5/0073; H04L 5/00; H04L 5/14; H04L
    1/1861; H04L 1/00; H04L 1/0028; H04L
    2001/0093; H04L 1/1812; H04L 1/0031;
    H04L 1/1893; H04L 5/0078; H04L
    1/1671; H04L 1/0015; H04L 1/0025;
    H04L 1/0029; H04L 1/20; H04L 25/0226;
    H04L 27/2602; H04W 24/10; H04W
    72/042; H04W 72/0446; H04W 72/0413;
    H04W 24/08; H04W 16/28; H04W 4/70;
    H04W 72/046; H04W 76/27; H04W
    72/085; H04W 88/02; H04W 72/082;
    H04W 72/1226; H04W 56/001; H04W
    88/08; H04W 80/08; H04W 92/18; H04W
    4/06; H04W 92/20; H04W 72/0406;
    H04W 72/0453; H04W 74/0833; H04W
    76/14; H04W 72/02; H04W 72/048;
    H04W 72/10; H04W 72/1284; H04W
    76/11; H04W 72/04; H04W 72/044;
    H04W 72/06; H04W 72/1273; H04W
    72/1289; H04W 72/14; H04W 88/06;
    H04W 52/242; H04W 52/346; H04W
    72/005; H04W 72/0426; H04W 72/0473;
    H04W 8/24; H04W 24/02; H04W
    28/0215; H04W 4/02; H04W 4/46; H04W
    40/12
    See application file for complete search history.

(56) References Cited

U.S. PATENT DOCUMENTS

| 9,451,474 | B2 | 9/2016 | Bhanage |
| 2011/0159799 | A1 | 6/2011 | Chen et al. |
| 2018/0183505 | A1* | 6/2018 | Kim ..................... H04B 7/0634 |
| 2019/0166526 | A1* | 5/2019 | Xu ..................... H04W 72/0453 |
| 2020/0244319 | A1* | 7/2020 | Lee ..................... H04B 17/336 |
| 2021/0099847 | A1* | 4/2021 | Uchiyama ............... H04W 4/46 |
| 2022/0053439 | A1* | 2/2022 | Hu ..................... H04W 56/0015 |

FOREIGN PATENT DOCUMENTS

| WO | 2009158545 A2 | 12/2009 |
| WO | 2010049801 A1 | 5/2010 |
| WO | 2016066231 A1 | 5/2016 |

* cited by examiner

TECHNIQUES FOR GROUP-BASED FEEDBACK FOR GROUPCAST TRANSMISSION IN COMMUNICATION SYSTEMS

CROSS-REFERENCE TO RELATED APPLICATIONS

This application is a continuation of International Application No. PCT/EP2018/073395, filed on Aug. 30, 2018, the disclosure of which is hereby incorporated by reference in its entirety.

FIELD

The present disclosure relates to techniques for group-based feedback, in particular for Multicast or Groupcast transmission, in particular for beamformed or non-beamformed transmission in communication systems such as 5G New Radio (NR). The disclosure relates to a base station, e.g. a gNodeB (5G base station) or eNodeB (evolved base station) and a User Equipment (UE), e.g. a UE in a vehicle, initiating and/or applying such group-based feedback.

BACKGROUND

Current radio interfaces (e.g. 3G-PPP, IEEE 802.11, etc.) employ direct feedback from the UE to the base station by using separate physical channels. For example, consider a scenario where multiple UEs, located in respective vehicles (e.g., cars), are connected to a base station (e.g. a gNodeB (gNB) or an eNodeB (eNB)) in a 5G communication network for providing feedback information to the base station. This scenario results in large overheads in the uplink channel, especially if multiple UEs (or cars) are connected to the base station. In heavy traffic situations, e.g. during congestion or even on a crowded highway, the uplink channel to the base station may be congested or even blocked.

SUMMARY

The present disclosure provides efficient techniques for reducing traffic, in particular signaling traffic in scenarios as described above. An embodiment of the present disclosure provides efficient techniques for group-based communication, in particular for providing group-based feedback in NR communication systems.

A basic idea of the present disclosure, as described hereinafter, includes applying a group-based feedback scheme for providing feedback from the UE to the base station, in particular for providing feedback for beamformed (or non-beamformed) transmission. The feedback scheme specifies how the UEs communicate with each other to exchange feedback information and how a UE group is formed. The disclosed group-based feedback scheme includes the following aspects:

1) Group-based feedback for beamforming with following aspects
   Configuration of UE group by gNB of a group of UEs.
   Explicit notification by gNB of:
      Which feedback to provide (CQI (channel quality index), Beam index, etc.). Example:
         Differential CQI/RSRP (reference signal received power)/beam index based on the leading UE and the correspondence between CSI and beam index; or full CQI/RSRP/beam index and the correspondence between CSI and beam index.
         Unequal CQI and RSRP number and the corresponding beam index for each UE to leading UE for aggregation or concatenation.
   In what form feedback should be: aggregated (i.e. differential/non-differential) or non-aggregated.
2) Selection of Reporting UE (UE reporting group feedback).
3) Collecting the feedback on Reporting UE.
4) Coordinating group feedback across multiple gNBs:
   {CQI/RSRP, beam index, group/UE information} transmission in Xn interface among gNBs based on the reporting from selected/leading UE in the same group.

All four components above are beneficial for enabling group feedback in a robust and efficient manner.

The disclosure is based at least on the following key concepts as described hereinafter:

A. A method to select reporting UE and configure the UE group for providing feedback for multicast/groupcast transmissions.

B. A method to provide feedback (e.g. CQI, RSRP, RSRQ (reference signal received quality) and beam indices, either aggregated or not) for group beam-forming through one UE (selected/reporting UE, i.e., group leader), a method to aggregate feedback across UEs.

C. In case of inter-cell operation, a method for coordination between gNBs.

The disclosed group-based feedback scheme is of particular relevance to 5G NR standardization.

In order to describe the present disclosure in detail, the following terms, abbreviations and notations will be used:
UE: User Equipment
BS: Base Station, gNodeB, eNodeB
NR: New Radio (standard)
CQI: channel quality index
RSRP: reference signal received power
RSRQ: reference signal received quality
CSIRS: channel state information reference signal
CRI: CSIRS resource index
SS/PBCH: synchronization signal/physical block
SSB: SS/PBCH block
BLER: block error rate
PRR: packet reception ratio
CSI: channel state information
SPS: semi-persistent scheduling
DL: downlink (direction)
UL: uplink (direction)
MCS: modulation and/or coding set
PMI: precoding matrix indicator
RI: rank indicator
BI: beam index
Xn: interface between gNBs in NR standardization According to a first aspect, the present disclosure relates to a base station, in particular a gNodeB, configured to: configure a transmission group comprising at least two User Equipments, UEs, and transmit a signal to at least one of UEs in the transmission group. The signal comprises information about a feedback to be received from at least one of the UEs in the transmission group. The feedback comprises information about the UEs in the transmission group.

Such a base station or gNB can configure UEs to provide group feedback to gNB from a group/cluster of UEs for beam-formed multicast and/or groupcast transmissions. A group can be defined as two or more UEs to which the same information shall be transmitted. An advantage of such a base station is to reduce feedback overhead, e.g. in uplink (UL) by exploiting sidelinks within a group. A further advantage is flexibility on how to provide feedback from a group of UEs. The base station or gNB facilitates improved availability and reliability for UEs suffering from a weak link due to path loss or fading, e.g. because of obstruction.

The transmission group can further comprise UEs that are not in coverage of the base station.

The expression "the base station is configured to configure something" means that there are hardware or software circuits or circuitry in the base station that enable the base station to do something, e.g. to configure a UE or any other hardware, software or physical entity.

In an exemplary implementation form of the base station, the base station is configured to configure the transmission group with respect to sidelink feedback for transmission from non-lead UEs of the transmission group to a lead UE of the transmission group. A lead UE can be a UE that is reporting the feedback signal.

Such base station provides the advantage that sidelink feedback can be used to offload signaling from the uplink channel.

In an exemplary implementation form of the base station, the base station is configured to configure the transmission group based on information provided by at least one UE of the transmission group.

Such a base station provides the advantage of flexible information acquisition. Any member (UE) of a transmission group can provide the information to the base station.

In an exemplary implementation form of the base station, the base station is configured to select the lead UE of the transmission group and/or receive information about the lead UE from at least one UE in the transmission group.

Such a base station provides the advantage that the lead UE can be flexible assigned. For example, the base station can select the lead UE or a lead UE can be pre-assigned and the base station is informed of the lead UE.

In an exemplary implementation form of the base station, the base station is configured to select the lead UE based on a quality of an uplink connection from the lead UE to the base station.

Such a base station provides the advantage that the lead UE will have the best uplink channel and is able to transmit the highest amount of information via the uplink channel to the base station.

In an exemplary implementation form of the base station, the base station is configured to select the lead UE based on at least one of the following options: a decision of the base station, in particular wherein the decision is based on channel conditions to the UEs of the transmission group; a cooperative agreement of the UEs of the transmission group; context information and/or reuse of existing concepts, in particular concepts from platooning use case where a UE of a first vehicle is the lead UE.

This provides a high degree of flexibility.

Existing concepts relate to use cases that are developed for UEs, in particular UEs arranged in groups. For example, in a platooning use case the first vehicle is usually the lead UE, as it is the first that gets in contact with changes in the environment, e.g. when approximating to a tunnel. In a sharing use case, different tasks are shared between UEs of the transmission group. In another use case, a specific UE may be configured to measure the uplink channel characteristics and this specific UE may serve as the lead UE. In another use case, the UE having the best uplink channel quality may be used as the lead UE. Existing concepts may refer to concepts of the application layer that specify the platooning use case or the sharing use case or other use cases.

In an exemplary implementation form of the base station, the base station is configured to form a common beam covering the UEs of the transmission group and/or separate beams for at least two UEs in the transmission group.

Such a base station provides the advantage of flexible beam creation according to the current requirements.

In an exemplary implementation form of the base station, the base station is configured to determine or configure the transmission group based on channel conditions between at least two UEs of the transmission group and/or based on channel conditions from the base station to at least one UE of the transmission group.

Such a base station provides the advantage that the transmission group can be optimally configured based on sidelink channel conditions and uplink channel conditions.

To determine, in the sense of the application, comprises that the base station receives all or a part of the information about the transmission group from another entity. Such an entity can be a core network device or another base station or a UE. Such an entity can also be an operator independent device.

In an exemplary implementation form of the base station, the base station is configured to configure the transmission group based on an ability of at least two UEs to communicate with each other, in particular based on reliability, throughput, path loss, fading and/or channel state information, CSI.

For example, the UEs can form the group if the quality communication is greater than a certain threshold. This provides the advantage that the transmission group guarantees sufficient communication capability between the UEs of the group.

In an exemplary implementation form of the base station, the base station is configured to re-configure the transmission group by: splitting the transmission group into two or more sub-groups, or merging the transmission group with at least one other transmission group or with at least one other UE.

Such base station provides the advantage of flexible group configuration and ad-hoc changes depending on the current channel situation. This further provides the advantage of improved availability and reliability for UEs suffering from a weak link due to path loss or fading, e.g. because of obstruction.

In an exemplary implementation form of the base station, the base station is configured to re-configure the transmission group based on changed channel conditions, in particular changed channel quality index, CQI, changed reference signal received power, RSRP, and/or changed beam index or based on predictive communication information.

Such base station provides the advantage that changed, e.g. decreased channel conditions allow to change the transmission group, e.g. by removing one UE which uplink or sidelink channel conditions have changed, e.g. by a higher distance to the other UEs of the group.

In an exemplary implementation form of the base station, the base station is configured to assign to the UEs of the transmission group: non-interfering resources for orthogonal transmission via the sidelink, overlapping resources for non-orthogonal transmission via the sidelink and/or resources providing multi-hop transmission via the sidelink.

Such base station provides the advantage that different options for implementing the sidelink communication can be realized. This provides flexibility on how to provide the feedback from a group of UEs.

In an exemplary implementation form of the base station, the base station is configured to configure the lead UE of the transmission group for aggregated group feedback or for non-aggregated group feedback.

Such base station provides the advantage of flexible configuration of the feedback. Aggregated group feedback may save transmission resources due to aggregating the transmitted information while non-aggregated group feedback may improve precision of control by the base station since the base station can decide based on a higher amount of information.

In an exemplary implementation form of the base station, the group feedback comprises at least one of the following: channel state information, CSI, channel quality indicator, CQI, reference signal received power, RSRP, reference signal received quality, RSRQ, beam index, CSI reference signal resource index, CRI, synchronization signal/physical broadcast channel block, SSB, index, precoding matrix identifier, PMI, rank identifier, RI, and V2X (vehicle-to-everything) specific information comprising: speed, direction, size of group, UE positions and/or inter-vehicle distances.

Such a base station provides the advantage that the base station can control based on a lot of different parameters which improves reliability of the communication.

In an exemplary implementation form of the base station, the base station is configured to determine a block error rate, BLER, and/or a packet reception ratio, PRR, for the transmission group.

Such base station provides the advantage that the base station can rank different transmission groups based on such Key Performance Indicators (KPIs) like BLER and/or PRR.

In an exemplary implementation form of the base station, the base station is configured to provide a group BLER over all UEs of the transmission group that satisfies an overall target BLER and/or UE-specific target BLERs.

Such base station provides the advantage that a state of the transmission group can simply be checked by evaluating the group BLER.

In an exemplary implementation form of the base station, the base station is configured to provide the group BLER based on: signaling the overall target BLER to the UEs of the transmission group and receiving from the lead UE a report of a target group modulation and/or a coding set, MCS, of the transmission group, or signaling the overall target BLER to the UEs of the transmission group, receiving from the lead UE a report of channel quality indicators, CQIs, of the UEs of the transmission group and determining the target group MCS based on the reported CQIs.

Such base station provides the advantage that the overall target BLER of a transmission group can be flexibly determined.

In an exemplary implementation form of the base station, the aggregated group feedback is based on feeding back a weighted mean, a normal mean, a maximum, a minimum and/or a median of a CQI, an RSRP or an RSRQ of all UEs of the transmission group.

Such base station provides the advantage that the base station can flexibly change the way of determining the aggregated group feedback, for example depending on the current channel conditions.

In an exemplary implementation form of the base station, the aggregated group feedback is based on feeding back a differential group CQI, RSRP and/or RSRQ which is based on a predefined or configured reference.

Such base station provides the advantage that the differential group CQI, RSRP and/or RSRQ requires less information bits for transmission than an absolute group CQI, RSRP and/or RSRQ, thereby saving transmission resources.

In an exemplary implementation form of the base station, the non-aggregated group feedback is based on feeding back: an associated beam index, CRI index and/or SSB index for a reported CQI, RSRP and/or RSRQ; or a CQI, RSRP and/or RSRQ for which a predefined or configured relationship to a beam index, CRI index and/or SSB index exists.

Such base station provides the advantage of flexible feedback of the beam index.

In an exemplary implementation form of the base station, the non-aggregated group feedback is based on differential CQI, RSRP and/or RSRQ based reporting for CQI, RSRP and/or RSRQ of the other UE's of the transmission group.

This provides the advantage that the base station receives information from multiple UEs of the transmission group. Besides, the differential CQI, RSRP and/or RSRQ requires less information bits for transmission than an absolute CQI, RSRP and/or RSRQ, thereby saving transmission resources.

In an exemplary implementation form of the base station, the non-aggregated group feedback is based on concatenating the CQI, RSRP and/or RSRQ of the UE's of the transmission group according to a CRI index or beam index order or according to an order configured by signaling.

This provides the advantage that the information received by the base station is in a specific order which facilitates the usage of this information by the base station.

In an exemplary implementation form of the base station, the base station is configured to coordinate the group feedback for transmission with other base stations, in particular other gNBs via Xn interface.

This provides the advantage that the feedback may be exploited by other base stations which can be informed early about changes in channel conditions or other scenarios.

In an exemplary implementation form of the base station, the base station is configured to predict resource requirements based on group feedback received from at least one of the other base stations.

Such base station provides the advantage that the base station can schedule resources earlier in time, thereby resulting in improved scheduling.

In an exemplary implementation form of the base station, the base station is configured to coordinate the group feedback with the other base stations based on CQI reports and/or metric reports from one or more UEs of the transmission group.

This provides the advantage that the base station is provided with a higher amount of information for scheduling their resources resulting in a better scheduling.

According to a second aspect, the present disclosure relates to a User Equipment, UE, configured to: receive a signal from a base station, in particular a gNB. The signal comprises information about a feedback to be reported to the base station from at least one of the UE or another UE in a transmission group configured by the base station. The transmission group comprises at least two UEs.

Such a UE can be configured by a base station or gNB to provide group feedback to gNB from a group/cluster of UEs for beam-formed multicast and/or groupcast transmissions. A group can be defined as two or more UEs to which the same information shall be transmitted. An advantage of such a UE is that feedback overhead can be reduced, e.g. in uplink (UL) by exploiting sidelinks within a group. A further advantage is flexibility on how to provide feedback from a group of UEs. The base station or gNB facilitates improved availability and reliability for UEs suffering from a weak link due to path loss or fading, e.g. because of obstruction.

In an exemplary implementation form of the UE, the signal comprises information about a lead UE configuration and/or a non-lead UE configuration.

Such a UE provides the advantage that the lead UE configuration can be flexible assigned as a lead UE or as a non-lead UE.

In an exemplary implementation form of the UE, the signal comprises information about a sidelink feedback for transmission to be sent to the base station from non-lead UEs of the transmission group to a lead UE of the transmission group.

Such a UE provides the advantage that sidelink feedback can be used to offload signaling from the uplink channel.

In an exemplary implementation form of the UE, the UE is configured to transmit information about the lead UE of the transmission group to the base station.

Such a UE provides the advantage that another UE than the lead UE can be used to transmit information about the lead UE to the base station. This can offload the lead-UE from signaling tasks.

In an exemplary implementation form of the UE, the information from the base station about the feedback is based on sidelink channel conditions between the UEs of the transmission group and based on uplink channel conditions from the UEs of the transmission group to the base station.

This provides the advantage of improved availability and reliability, in particular for UEs suffering from a weak link due to path loss or fading. For example, a UE having the best uplink channel can be selected as lead UE for reporting the feedback of other UEs.

In an exemplary implementation form of the UE, the UE is configured to report the feedback to the base station based on aggregated group feedback or based on non-aggregated group feedback.

Such a UE provides the advantage of flexible reporting the feedback. Aggregated group feedback may save transmission resources due to aggregating the transmitted information while non-aggregated group feedback may improve precision of control by the base station since the base station can decide based on a higher amount of information.

In an exemplary implementation form of the UE, the feedback comprises CQI reports and/or metric reports from the UE with the base station or with other base stations.

This provides the advantage that the UE may provide feedback with other base stations. The base station can hence be informed early about changes in channel conditions or other scenarios and initiate a necessary hand-over to another base station.

According to a third aspect, the present disclosure relates to a method for group-based feedback transmission. The method includes: configuring a transmission group comprising at least two User Equipments, UEs; and transmitting a signal to at least one of UEs in the transmission group. The signal comprises information about a feedback to be received from at least one of the UEs in the transmission group. the feedback comprises information about the UEs in the transmission group.

Such a method can reduce feedback overhead, e.g. in uplink (UL) by exploiting sidelinks within a group. A further advantage is flexibility on how to provide feedback from a group of UEs. Improved availability and reliability for UEs suffering from a weak link due to path loss or fading, e.g. because of obstruction can be achieved by such method.

According to a fourth aspect, the present disclosure relates to a computer program product including computer executable code or computer executable instructions that, when executed, causes at least one computer to execute the method according to the second aspect. Such a computer program product may include a non-transient readable storage medium storing program code thereon for use by a processor, the program code comprising instructions for performing the methods or the computing blocks as described hereinafter.

BRIEF DESCRIPTION OF THE DRAWINGS

Further exemplary embodiments of the present disclosure will be described with respect to the following figures, in which.

DETAILED DESCRIPTION

Figure 1:
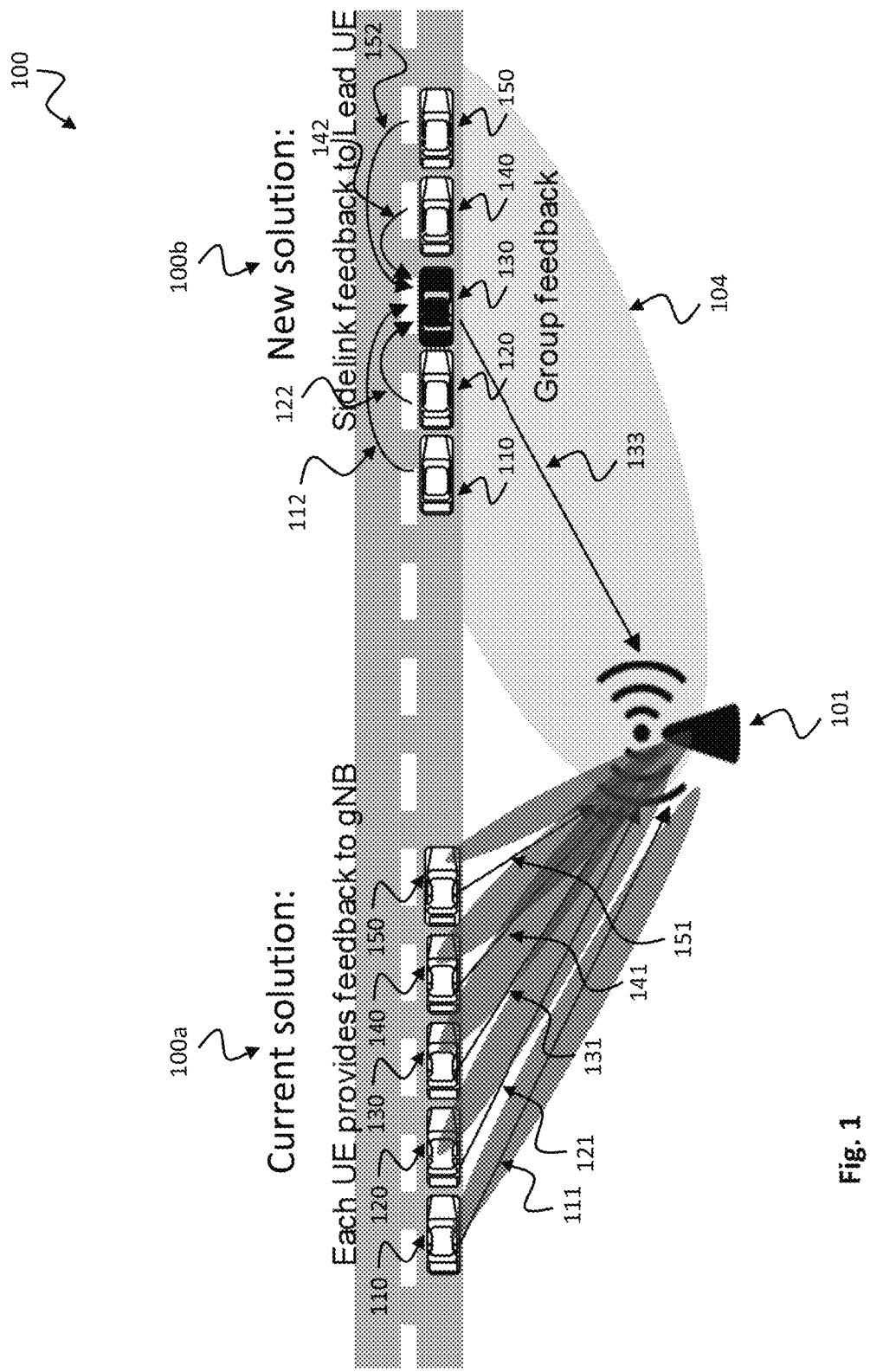
FIG. 1 shows a schematic diagram 100 illustrating a scenario 100a of beamformed communication for a current solution (left side of FIG. 1) and a scenario 100b of beamformed communication for the new solution according to the disclosure (right side of FIG. 1)

In the following detailed description, reference is made to the accompanying drawings, which form a part thereof, and in which is shown by way of illustration exemplary aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may be implemented in wireless communication networks based on 5G NR (New Radio) mobile communication standards and beyond. The methods, devices and systems described herein may also be implemented in wireless communication networks based on mobile communication standards such as LTE, in particular 3G, 4G and 4.5G. The methods, devices and systems described herein may also be implemented in wireless communication networks, in particular communication networks similar to WiFi communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender).

The devices and systems described herein may include processors or processing devices, memories and transceivers, i.e. transmitters and/or receivers. In the following description, the term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

In the following, base stations and User Equipments are described. Examples of a base station may include access nodes, evolved NodeBs (eNBs), gNBs, NodeBs, master eNBs (MeNBs), secondary eNBs (SeNBs), remote radio heads and access points.

FIG. 1 shows a schematic diagram 100 illustrating a scenario 100a of beamformed communication for a current solution (left side of FIG. 1) and a scenario 100b of beamformed communication for the new solution according to the disclosure (right side of FIG. 1). In the scenario 100a multiple UEs individually transmit feedback to a base station by separate physical channels according to a current solution. In the scenario 100b multiple UEs (that may be the same UEs as in scenario 100a) transmit sidelink feedback to a lead UE which transmits group feedback to the base station by a single physical channel according to the novel solution.

In the following, the scenario 100b of beamformed communication for the new solution according to the disclosure is described in more detail. Note that the scenario 100b may also be applied with non-beamformed communication.

In this scenario 100b, a group of cars are driving on the street, each car equipped with a respective User Equipment 110, 120, 130, 140, 150. One of the cars, e.g. car with UE 130 in this scenario 100b is the group leader, also referred to as lead UE, that receives sidelink feedback information 112, 122, 142, 152 from the other UEs 110, 120, 140, 150 of the group of cars. The lead UE 130 provides a group feedback 133 that includes information about the individual feedbacks 112, 122, 142, 152 from the other UEs to the base station 101 by a transmission beam 104.

The base station 101 may be a gNodeB that is configured or adapted to configure a transmission group comprising at least two User Equipments, UEs, e.g. transmission group of UEs 110, 120, 130, 140, 150 as shown in FIG. 1. The base station 101 is further configured to transmit a signal to at least one of UEs in the transmission group, e.g. to lead UE 130. This signal comprises information about a feedback 133 to be received from at least one of the UEs in the transmission group, e.g. from the lead UE 130. The feedback 133 comprises information about the UEs in the transmission group.

The User Equipment, UE, e.g. lead UE 130 in the Example of FIG. 1, is configured to receive a signal from the base station 101. In the Example of FIG. 1, the lead UE 130 receives this signal from the BS 101 but any other UE 110, 120, 140, 150 may receive this signal as well. This signal comprises information about a feedback 133 to be reported to the base station 101 from at least one of the UE 130 or another UE 110, 120, 140, 150 in the transmission group which is configured by the base station 101. The transmission group comprises at least two UEs.

The scenario 100b illustrates the configuration, how the UEs 110, 120, 130, 140, 150 communicate with each other to exchange feedback information 112, 122, 142, 152, 133 and how a UE group is formed. The disclosed group configuration scheme is related to the following aspects:

Explicit group based feedback configuration by gNB of which feedback to provide (e.g., CQI, RSRP, RSRQ, beam index (equivalent resource index e.g. CSIRS resource index, SS/PBCH block index), BLER, PRR, mobility, block-SR, periodicity of CSI feedback including sidelinks):
Including mechanisms to determine group feedback CQI/beam index;
Notification by gNB of granted resources;
In what form feedback is implemented (e.g., aggregated/non-aggregated).
Reservation or request of sidelink resources for group feedback by the group leader.
Feedback/group configuration by gNB:
$1^{st}$ option: send the feedback/group configuration to the lead (also referred to as reporting) UE, then relay to other UEs;
$2^{nd}$ option: send the feedback/group configuration to each UE directly (either unicast or broadcast, exploiting that the BS knows the group in advance).
The following key concepts are disclosed hereinafter:
A. A method to select reporting UE and configure the UE group for providing feedback for multicast/groupcast transmissions.
B. A method to provide feedback (e.g. CQI, RSRP, RSRQ and beam indices, either aggregated or not) for group beam-forming through one UE (selected/reporting UE, i.e., group leader), method to aggregate feedback across UEs.
C. In case of inter-cell operation, a method for coordination between gNBs.

An exemplary method to configure the UE group for providing feedback for multicast/groupcast transmissions according to Key concept A is described below with respect to FIG. 2. An exemplary method to select reporting UE according to Key concept A is described below with respect to FIG. 3. An exemplary method to provide feedback and to aggregate feedback across UEs according to Key concept B is described below with respect to FIGS. 4, 5 and 6. An exemplary method for coordination between gNBs according to Key concept C is described below with respect to FIG. 7.

Figure 2:
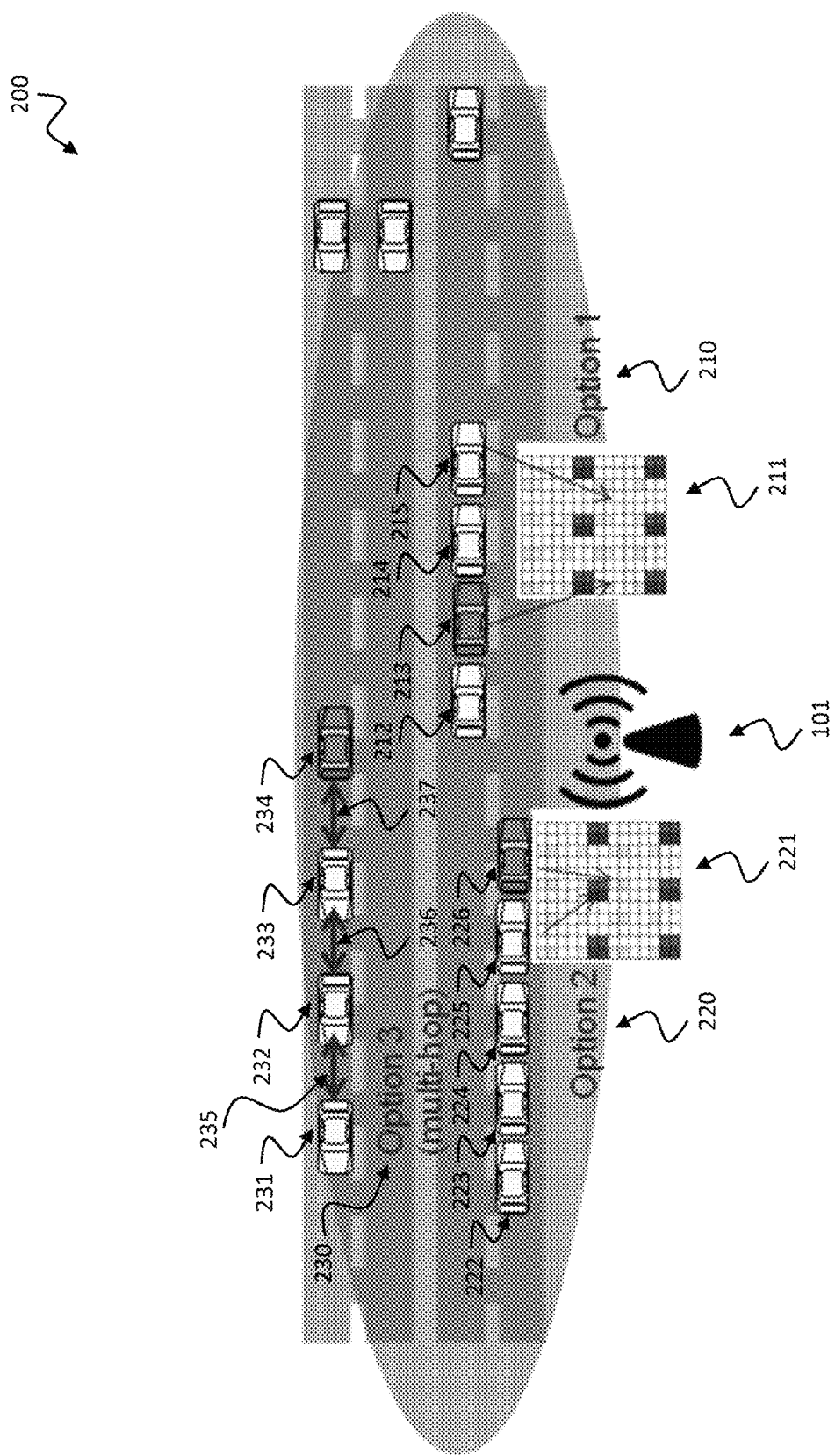
FIG. 2 shows a schematic diagram illustrating scenarios 200 for group members of a transmission group 210, 220, 230 to report feedback to a lead UE of the transmission group according to the disclosure.

FIG. 2 shows a schematic diagram illustrating scenarios 200 for group members of a transmission group 210, 220, 230 to report feedback to a lead UE of the transmission group according to the disclosure.

For a multicast transmission in the downlink to occur, the gNB 101 needs to know which UEs/vehicles are part of the group. In this context, the group is defined as at least two UEs that want to receive the same data. This transmission group consists of UEs that are geographically close to each other, which enables group feedback and support by a common multicast beam. The transmission group can be a subset of the overall multicast service group which can extend over a wide area. In FIG. 2, there are three transmission groups, a first group 210 includes UEs 212, 213, 214, 215 with lead UE 213; a second group 220 includes UEs 222, 223, 224, 225, 226 with lead UE 226; and a third group 230 includes UEs 231, 232, 233, 234 with lead UE 234. The base station 101, i.e. gNB configures the group, assisted by information provided by the group, when necessary. In particular, gNB 101 decides on grouping UEs for reporting purposes based on one of the following: Channel condition between UEs and from gNB 101 to UEs. For example, gNB 101 can configure the group according to the ability to transmit the data to the group by satisfying the requirements (e.g., reliability, throughput). This depends on path loss and fading. Also, the spatial CSI will influence the grouping decision. Efficient beamforming requires that the spatial channel signatures of the UEs are correlated (i.e., similar beam index). Groups can be (re)configured based on predictive communication information as follows. As the reporting group changes (e.g., in case of platoons) or before vehicles enter or leave a tunnel (because of limited/partial coverage), gNB 101 may update the group by splitting or merging the group.

Based on any of the conditions above, groups can be reconfigured by gNB 101 dynamically. For example, gNB 101 can reconfigure the group due to considerably changed CQI/RSRP/beam index.

In addition to group formation and lead UE selection, a method is disclosed for group members to report the required information to leading UE. The method can depend on the size of group, channel condition, and available resources. The following options, depicted in FIG. 2, are disclosed:

Option 1 (illustrated for first group 210): Orthogonal resources 211 via the sidelink. Vehicles (i.e. UEs 212, 214, 215) are assigned non-interfering resources, which they use to report the information to leading UE 213.

Option 2 (illustrated for second group 220): Non-orthogonal transmission 221 via the sidelink: in this case, techniques such as superposition coding can be used to transmit information on overlapping resources Option 3: (illustrated for third group 230): Multi-hop, e.g., in case of high attenuation on the member-leader link.

Figure 3:
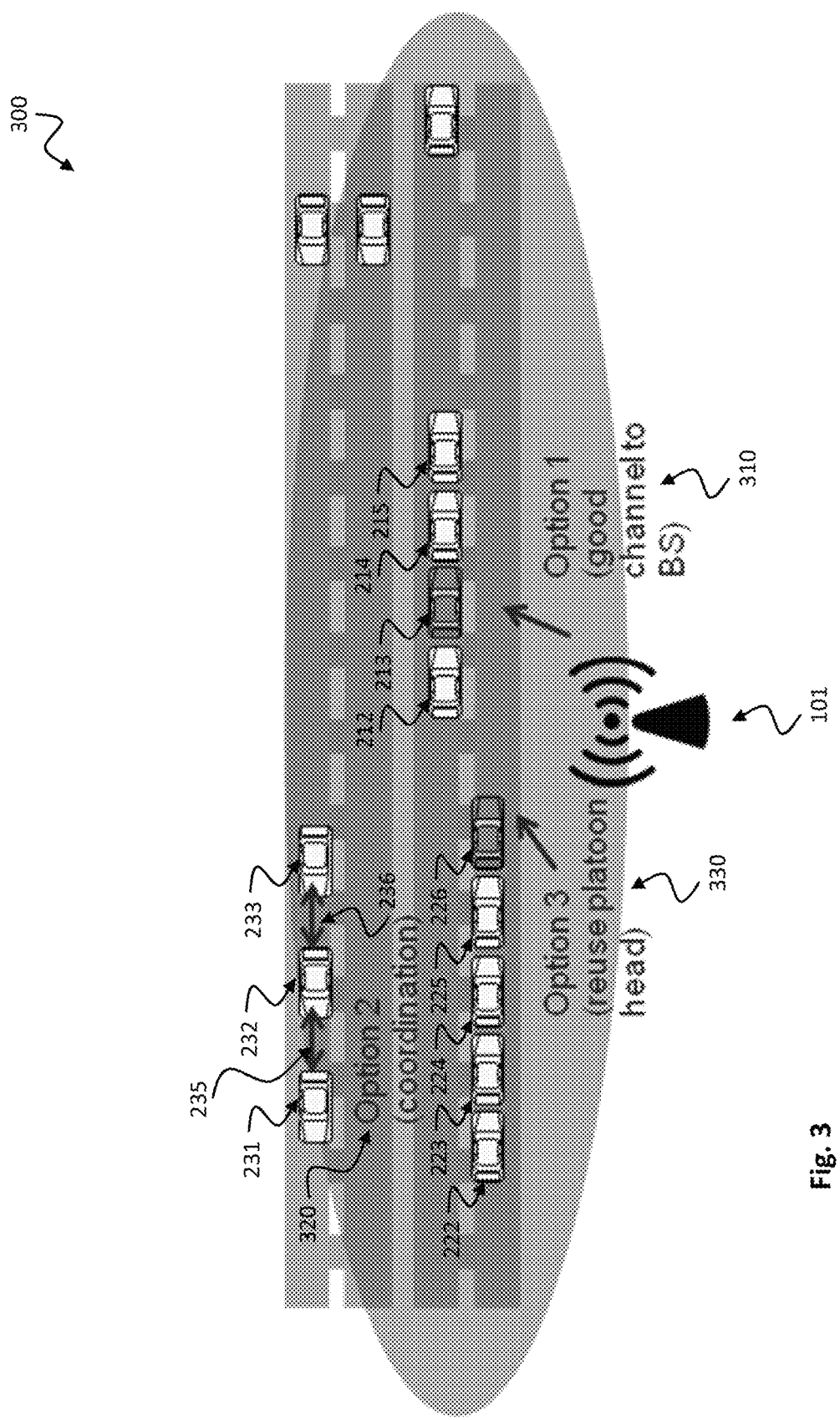
FIG. 3 shows a schematic diagram illustrating scenarios 300 for selecting a lead or reporting UE according to the disclosure.

FIG. 3 shows a schematic diagram illustrating scenarios 300 for selecting a lead or reporting UE according to the disclosure.

In the example of FIG. 3, there are three transmission groups, a first group 310 includes UEs 212, 213, 214, 215 with lead UE 213; a second group 320 includes UEs 231, 232, 233 for which a lead UE is not yet determined; and a third group 330 includes UEs 222, 223, 224, 225, 226 with lead UE 226.

Effective selection of reporting UE (or lead UE) is essential for reliable group feedback. Reporting UE selection can depend on existence/quality of uplink connection. Note that some vehicles in a target group can be in a deep fade and have poor uplink connection. This will impact the selection of reporting UE. The following options, depicted in FIG. 3, exist for selecting the reporting/lead UE:

Option 1 (illustrated for first group 310): gNB 101 decision (e.g., based on channel condition to UEs 212, 213, 214, 215) and signaling to chosen lead UE 213 and other group UEs 212, 214, 215.

Option 2 (illustrated for second group 320): Coordination between vehicles (i.e. UEs of vehicles): vehicles 231, 232, 233 agree cooperatively on the reporting/lead UE and signal the decision to gNB 101.

Option 3 (illustrated for third group 330):: Reusing existing concepts from higher layers or context information. One example of such information is in case of platooning use case, where first vehicle 226 is designated as lead.

Figure 4:
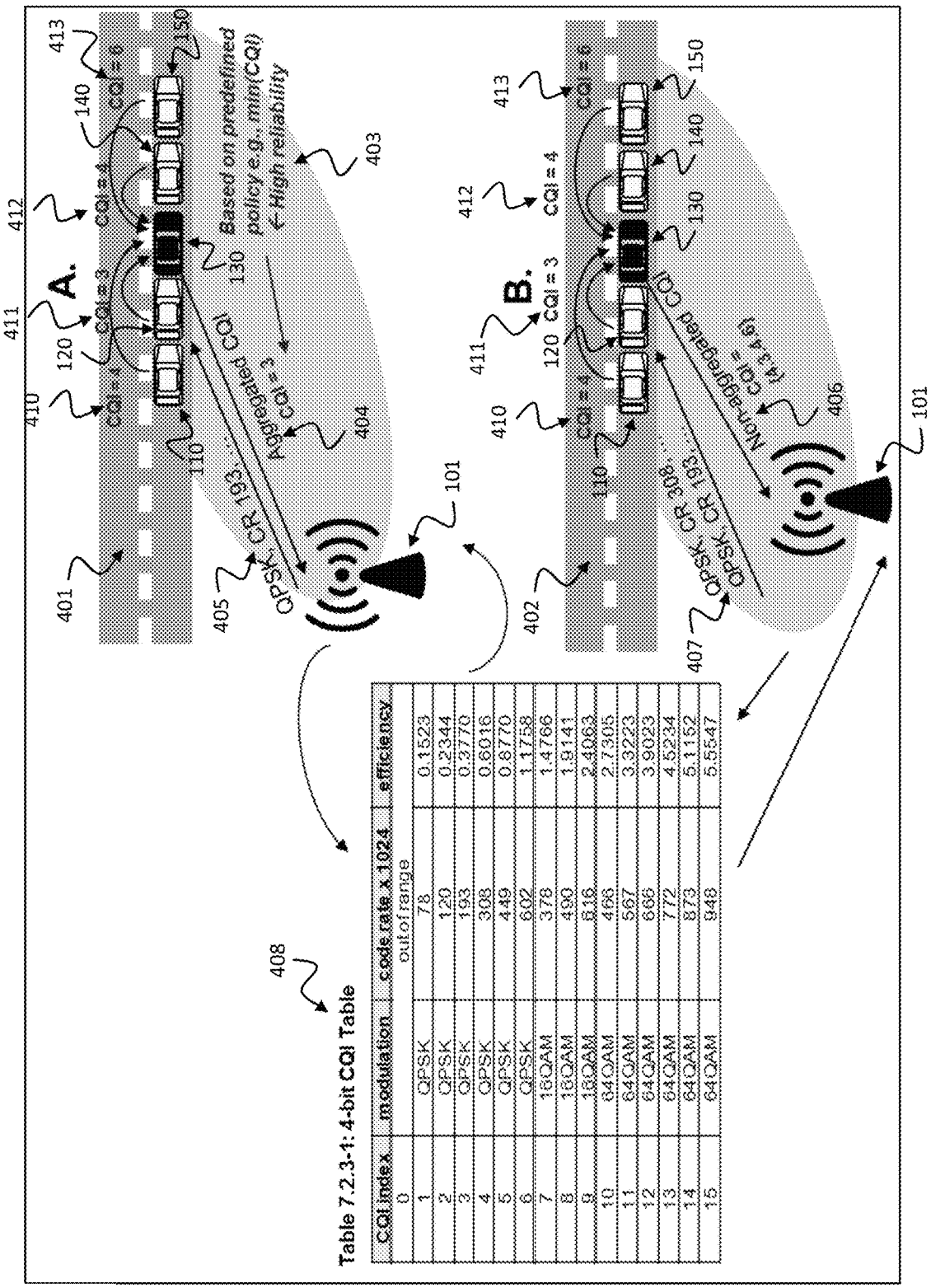
FIG. 4 shows a schematic diagram illustrating a scenario a), 401 for providing aggregated CQI feedback and a scenario b), 402 for providing non-aggregated CQI feedback according to the disclosure.

FIG. 4 shows a schematic diagram illustrating a scenario a), 401 for providing aggregated CQI feedback and a scenario b), 402 for providing non-aggregated CQI feedback according to the disclosure. The group of cars with UEs 110, 120, 130, 140, 150 may correspond to the group of UEs 110, 120, 130, 140, 150 as described above with respect to FIG. 1, in particular scenario 100b.

In scenario a), 401 aggregated CQI feedback 404 is provided by lead UE 130 which receives sidelink feedback from the other UEs 110, 120, 140, 150 of the transmission group. In this example, UE 110 provides information CQI=4 via sidelink feedback 410 to lead UE 130; UE 120 provides information CQI=3 via sidelink feedback 411 to lead UE 130; UE 140 provides information CQI=4 via sidelink feedback 412 to lead UE 130; and UE 150 provides information CQI=6 via sidelink feedback 413 to lead UE 130. Based on predefined policy, e.g. minimum of CQI values, aggregated CQI 404 is determined by lead UE 130 to be CQI=3 and reported via group feedback channel to BS 101. Based on this aggregated CQI, base station 101 performs a lookup in 4-bit CQI table 408 to receive the modulation (e.g. QPSK) and/or code rate (e.g. 193 for CQI=3). Base station 101 transmits a downlink signal 405 including the modulation and/or code rate to lead UE 130.

In scenario b), 402 non-aggregated CQI feedback 406 is provided by lead UE 130 which receives sidelink feedback from the other UEs 110, 120, 140, 150 of the transmission group. In this example, the same CQI values are provided by the UEs 110, 120, 140, 150 as described above for scenario a)(, 401. The lead UE 130 reports non-aggregated CQI 406 comprising the individual CQI values, i.e. CQI={4, 3, 4, 6} via group feedback channel to BS 101. Based on this non-aggregated CQI, base station 101 performs a lookup in 4-bit CQI table 408 to receive the modulation (e.g. QPSK) and/or code rate (e.g. 308 for CQI=4 and 193 for CQI=3, etc.) Base station 101 transmit a downlink signal 407 including the modulation and/or code rate to lead UE 130.

There may exist additional requirements for determining CQI/MCS/beam index based on a predefined policy. In particular, there may exist application requirements, arising from the application/use case need for certain level of reliability, throughput, etc. For example, in case of ensuring reliability using retransmissions, subsequent HARQ retransmission rounds may be adjusted based on the target BLER (block error rate). Similarly, in case of some applications, the connection to the group leader may necessitate lower error rates, thus a variable BLER for vehicles (e.g., lower target BLER for leader, higher for other vehicles) may be employed.

Another relevant aspect is the channel condition (e.g., interference or strong fading), which may affect the reliability of group communication and consequently impact the type of feedback required (e.g., more robust in case of high interference).

Some example use cases for group feedback (aggregated or non-aggregated) are:

i) The feedback, e.g. UL channel, is good for leader and bad for group members, but they can receive DL signal (at lower SNR);

ii) The reverse direction, e.g. UL, may only have SPS, but the forward direction, e.g. DL, is Multicast transmission.

The feedback information can include the following:

channel State Information (CSI), e.g. Channel Quality Indicator (CQI), or RSRP or RSRQ, beam index, CSIRS resource index (CRI), SS/PBCH block index (SSB index), PMI, RI etc.

V2X specific information, e.g. speed, direction (trajectory), or size of group, UE positions, inter-vehicle distances etc.

The main motivation for group BLER calculation is that some applications may have the target of an overall BLER value for the receiving group (e.g., transmitting cooperative awareness or event messages to a group of users with a fixed overall BLER target). Similar to the reporting group, another target of providing group BLER is the reduction of UL feedback overhead.

BLER and/or PRR (packet reception rate) may be calculated for the entire group. I.e., BLER may be calculated over all group members satisfying a target per-vehicle BLER. For example a maximum group (overall) BLER of 5% and a maximum per-vehicle BLER of 10% may be set.

In the following two exemplary options are disclosed for calculating group BLER.

Option 1: gNB signals the target group BLER. Reporting UE/vehicle calculates target group MCS and reports to gNB.

Option 2: gNB signals the target group BLER. Reporting UE/vehicle collects CQI and reports to gNB (in either aggregated or non-aggregated form). Based on reported CQI, gNB calculates target group MCS.

For CSI, with the mode selected and configured by serving gNB, two exemplary cases of group based feedback configuration are disclosed, i.e. aggregated (Case 1) and non-aggregated (Case 2), and CQI as an example of CSI are described below:

Case1: Aggregated form (i.e. mean (weighted or normal), max, min, median) of all group UEs. For example, by feeding back the minimum CQI, the gNB is able to adapt the MCS to the worst link, thus ensuring that the multicast signal can be correctly received by all UEs of the group. In this case, the achievable data rate is limited by the worst UE. A better throughput is generally achieved by using weighted aggregation, which feeds back the CQI.

For case 1, i.e. Aggregated/non-concatenated CSI feedback, UE may use {i.e. mean (weighted or normal), max, min, median} CQI/RSRP/RSRQ it received from other UEs for the group CQI reporting. Alternatively, the group CQI/RSRP/RSRQ can be a differential CQI/RSRP/RSRQ for the CSI reporting, where the reference CQI/RSRP/RSRQ can be predefined or configured. An example is 3-bit differential CQI value for group CQI offset level. For example, the following relation holds: Group CQI offset level=CQI index for selected (leading) UE—CQI index for group CQI. An exemplary mapping from the 3-bit inter UE differential CQI value to the offset level is shown in Table 1.

TABLE 1

An example for 3-bit differential CQI value mapping

| Differential CQI value | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

Case2: Non-aggregated concatenated CQI for all group UEs members. For non-aggregated CQI, gNB can decide for single or multiple beams (depending on beam feedback configuration). Differential CQI may also be used.

Some further details for concatenated/non aggregated CSI feedback are described in the following.

Reporting UE may report either 1) associated beam index/CRI/SSB index for reported CQI/RSRP/RSRQ or 2) there is a predefined/configured relationship between beam index/CRI/SSB index and reported CQI/RSRP/RSRQ.

Reporting UE may report its own and other UE's CQI/RSRP/RSRQ. Reporting UE may use differential CQI/RSRP/RSRQ based reporting for the other UE's CQI/RSRP/RSRQ, where the reference CQI/RSRP/RSRQ can be predefined or configured. Reporting UE may concatenate the CQI/RSRP it received according to CRI/beam index order or the order configured by signaling. More than one RSRP and beam index for one UE can be supported by configuration, e.g. each UE transmit {CQI, RSRP1, CRI/SSB index/beam 1} {RSRP2, CRI/SSB index/beam2}, {RSRP3, CRQ/SSB index/beam3} to the leading UE.

Reporting UE may report CQI and the associated beam index. The beam index can be the differential beam index relative to the reporting UE's beam index (as mentioned below).

A 3-bit inter UE differential CQI value for offset level may be specified according to the following example: offset level=CQI index for selected (leading) UE—CQI index for other UE. An Example for the mapping from the 3-bit inter UE differential CQI value to the offset level is shown in Table 2.

TABLE 2

An example for inter UE differential CQI value mapping

| Inter UE differential CQI value | Offset level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

Figure 5:
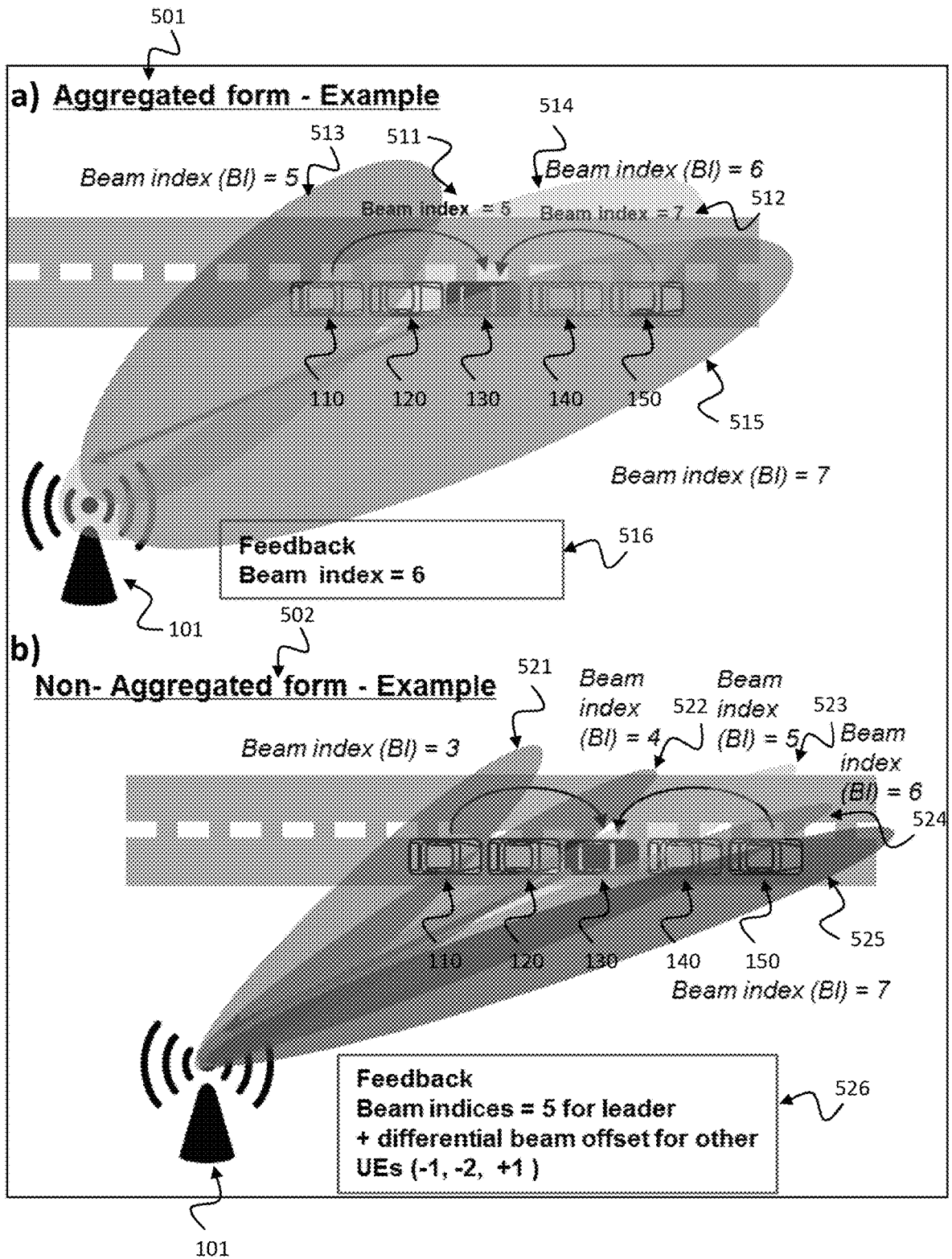
FIG. 5 shows a schematic diagram illustrating a scenario a) for providing aggregated beam index feedback 501 and a scenario b) for providing non-aggregated beam index feedback 502 according to the disclosure.

FIG. 5 shows a schematic diagram illustrating a scenario a) for providing aggregated beam index feedback 501 and a scenario b) for providing non-aggregated beam index feedback 502 according to the disclosure.

In scenario a), 501 aggregated beam index feedback 516 is provided by lead UE 130 which receives sidelink feedback from the other UEs 110, 120, 140, 150 of the transmission group. In this example, three beams 513, 514, 515 are connected from BS 101 to UEs 110, 120, 130, 140, 150.

UE 110 provides beam index BI=5 via sidelink feedback 511 to lead UE 130 and UE 150 provides beam index BI=7 via sidelink feedback 514 to lead UE 130. Based on the provided beam indices BI=5 and BI=7 lead UE 130 determines an aggregated beam index as BI=6 that is reported as group feedback 516 to BS 101.

In scenario b), 502 non-aggregated beam index feedback 526 is provided by lead UE 130 which receives sidelink feedback from the other UEs 110, 120, 140, 150 of the transmission group. In this example, five beams 521, 522, 523, 524, 525 are connected from BS 101 to the respective UEs 110, 120, 130, 140, 150. A first beam 521 to UE 110 provides information about beam index BI=3; a second beam 522 to UE 120 provides information about beam index BI=4; a third beam 523 to UE 130 provides information about beam index BI=5; a fourth beam 524 to UE 140 provides information about beam index BI=6; and a fifth beam 525 to UE 115 provides information about beam index BI=7. The lead UE 130 reports aggregated beam index 526 to BS 101. For example a differential form may be used in which a beam index BI=5 is used as reference for lead UE 130 and differential beam offset values {−1, −2, +1} are used for the other UEs 110, 120, 140, 150.

Feedback of TRP (Transmit-Receive Point) beam index (resource/CRI/SSB index) for the group of UEs 110, 120, 130, 140 to the gNB 101 may be set and configured by the serving gNB 101. The transceiver located in the base station 101 or gNB which performs transmitting and receiving signals, may be referred to as TRP.

Two forms of feedback configuration are disclosed, aggregated form and non-aggregated form as illustrated in FIG. 5.

The aggregated form (i.e. combination of TRP beam index or indices) may be configured to be one beam resource or may be a 'set of beam resources' which are common to all UEs. The serving gNB/TRP can weight these beams at the TRP for transmission using the corresponding signal strength CQI (RSRP or RSRQ) per beam. In an example use case, (almost) all vehicles are covered by one (or one common set of) TRP/gNB beam(s), depending on size of group, width of beam, and distance between groups, etc.

In the non-aggregated form feedback from all UEs is provided to the BS 101. In an example use case for this configuration, one beam may be too narrow or the platoon may be too long. All beam indices for each UE in the group may be separately feedback (resulting in a high overhead). Beam indices for the leader and differential beam indices for the other vehicles (i.e. +/−1, 2) may be feedback (resulting in reduced feedback overhead, only 1 or 2 bits are needed for differential beams).

Figure 6:
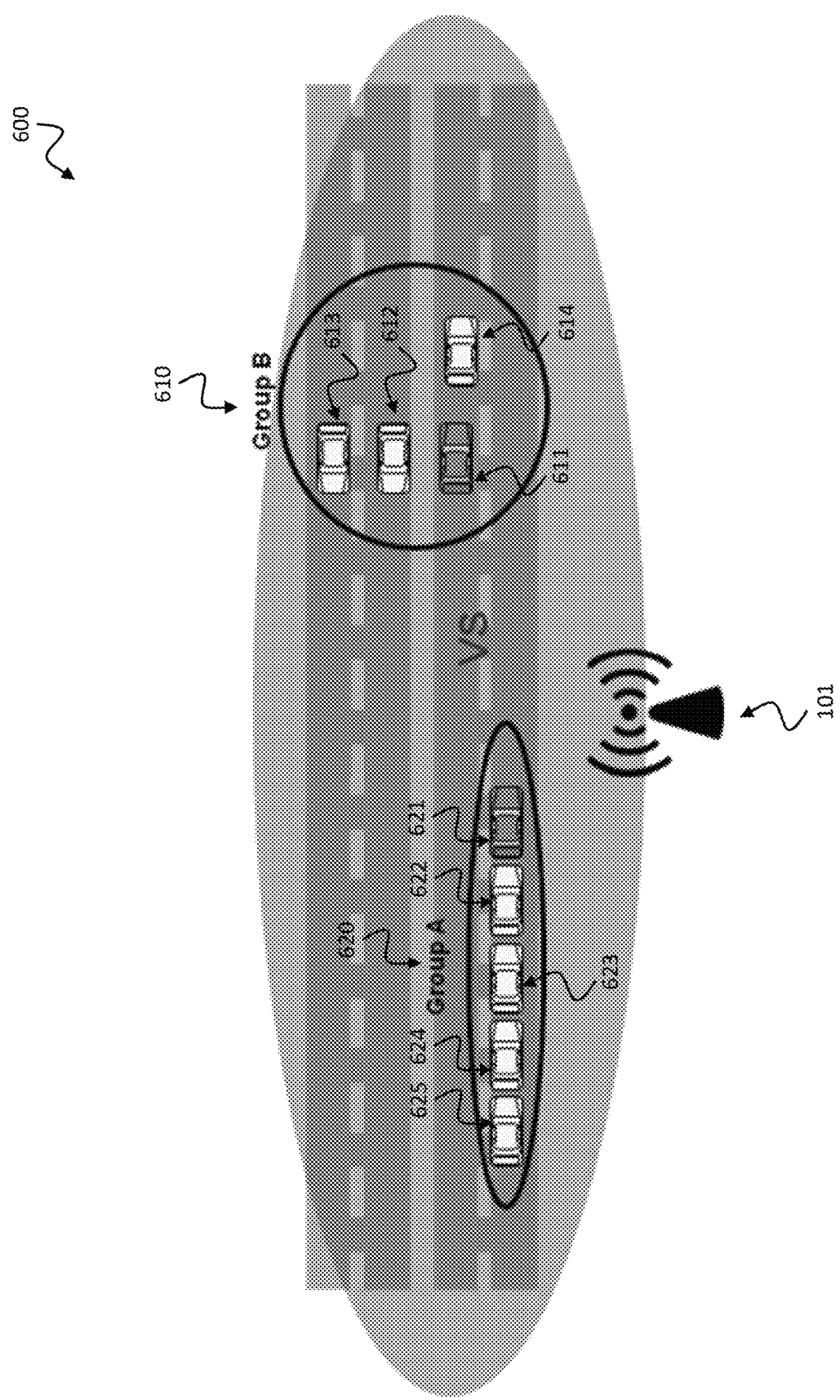
FIG. 6 shows a schematic diagram illustrating scenarios 600 for providing V2X-specific information to the base station 101 by the reporting or lead UE according to the disclosure.

FIG. 6 shows a schematic diagram illustrating scenarios 600 for providing V2X-specific information to the base station 101 by the reporting or lead UE according to the disclosure.

In FIG. 6 two groups 620, 610 are illustrated. Group A, 620 includes vehicles, i.e. UEs 621, 622, 623, 624, 625, where vehicle with UE 621 is the lead UE. All vehicles in group A drive in the same direction, i.e. from left to right. Group B, 610 includes vehicles, i.e. UEs 611, 612, 613, 614, where vehicle with UE 611 is the lead UE. Vehicles in Group B, 610 drive in different directions, vehicles 611, 614 drive from left to right direction, while vehicles 612, 613 drive from right to left direction.

The following types of feedback are disclosed: Speed, direction (trajectory), or size of group, UE positions, inter-vehicle distances etc., also denoted as context information. The purpose thereof is helping with estimating rate of change of the channel (e.g., platoon versus cluster of vehicles moving in two directions) and required feedback rate. This can also be used for multicast grouping.

Figure 7:
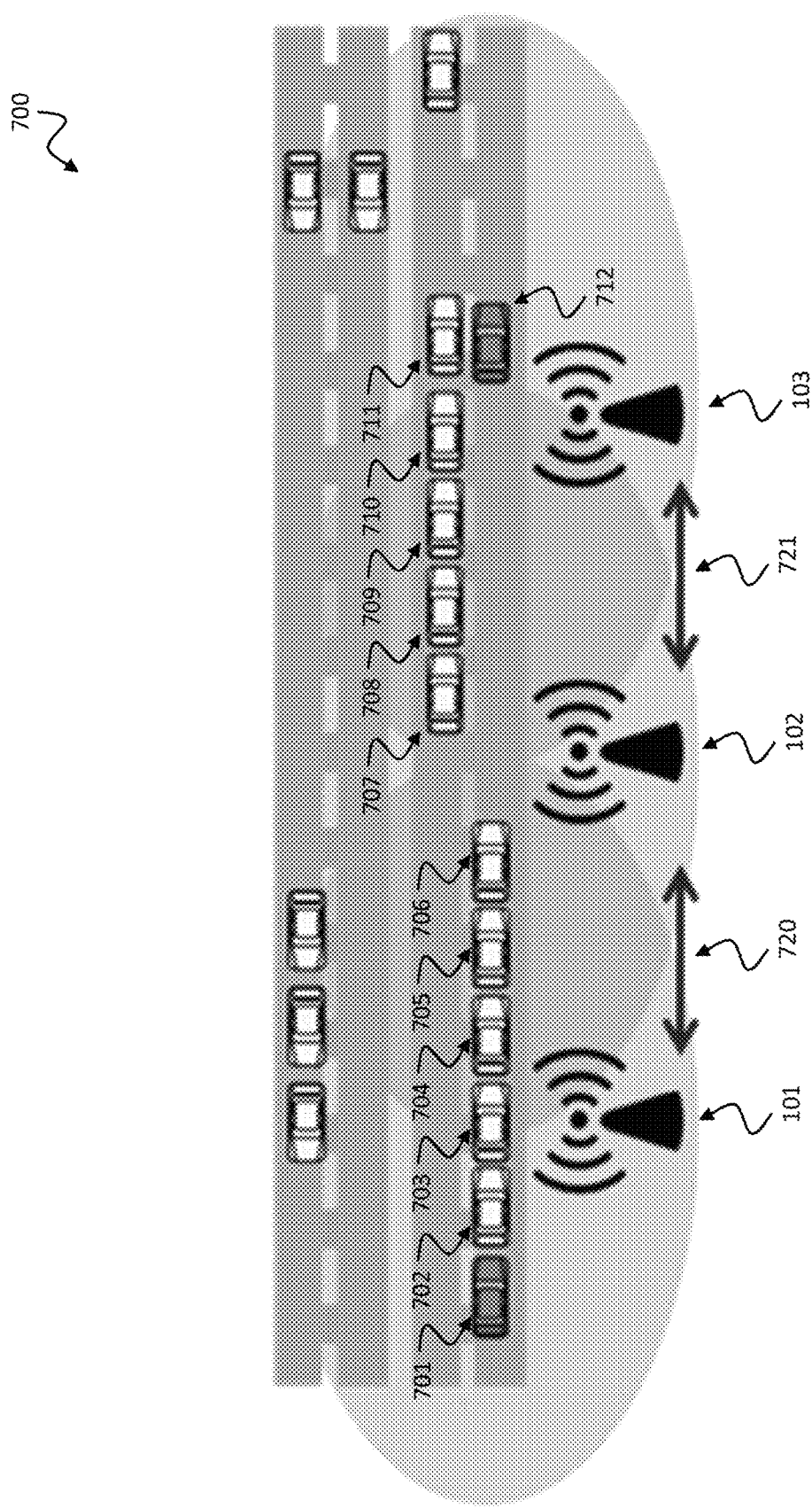
FIG. 7 shows a schematic diagram illustrating a coordination scenario 700 across gNBs or base stations 101, 102, 103 according to the disclosure.

FIG. 7 shows a schematic diagram illustrating a coordination scenario 700 across gNBs or base stations 101, 102, 103 according to the disclosure. A first group of cars with respective UEs 701, 702, 703, 704, 705, 706 is close to or in a range to base station 101, while a second group of cars with respective UEs 707, 708, 709, 710, 711, 712 is close to or in a range to base station 103 (and base station 102).

Coordination between gNBs 101, 102, 103 may be necessary in any case where the group transitions between different gNBs 101, 102, 103 (as illustrated in FIG. 7) and the group communication needs to be maintained. For high frequency transmissions, this is a particularly important aspect, since there is a high chance for a group to be in coverage of multiple gNBs (e.g. second group in coverage of BS 102 and BS 103 as shown in FIG. 7). The coordination can occur via Xn interface 720, 721, where the gNBs 101, 102, 103 can predict resource requirements in next cell based on the usage in the current cell. The communication for coordination can occur as follows:

Reporting UE (or lead UE) 701 provides feedback to the serving gNB 101. Some group members can report CQI/other metrics for multiple gNBs (e.g. UE 705, 706 may report to BS 101 and BS 102). Reporting UE 701 may send per-gNB feedback (e.g. in aggregated form as described above). gNBs 101, 102 coordinate to serve the group. For example gNB 101 may coordinate via Xn interface 720 with gNB 102 to hand-over first group to gNB 102.

Figure 8:
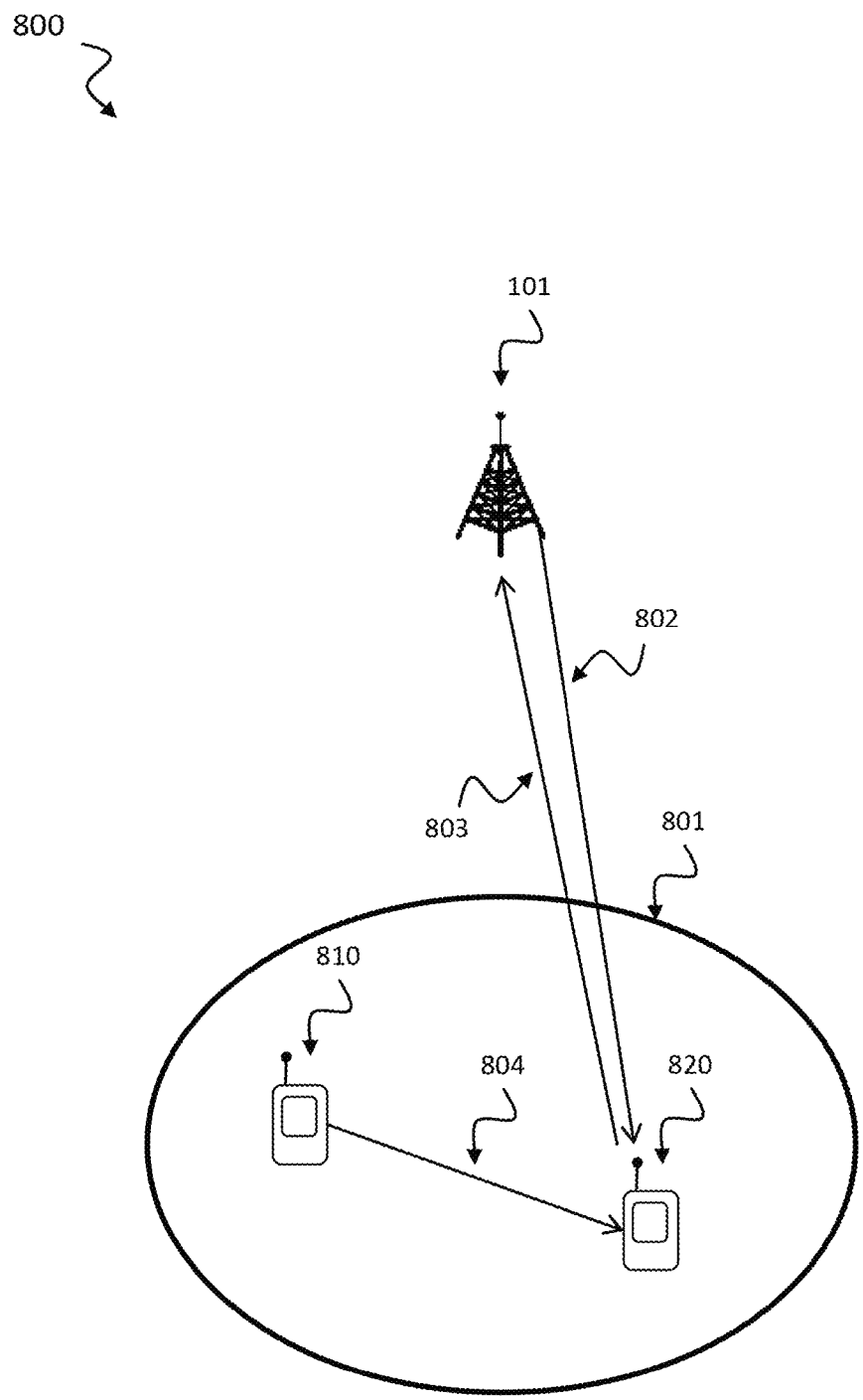
FIG. 8 shows a schematic diagram illustrating a base station 101 configuring group-based feedback for a group of UEs according to the disclosure.

FIG. 8 shows a schematic diagram illustrating a base station 101 configuring group-based feedback for a group of UEs according to the disclosure. FIG. 8 describes the general scenario that may be applied to the scenarios described above with respect to FIGS. 1 to 7. The base station 101 may correspond to the base stations described above with respect to FIGS. 1 to 7.

The base station 101, in particular a gNodeB, configures a transmission group 801 comprising at least two User Equipments, UEs 810, 820. The base station transmits a signal 802 to at least one of the UEs 810, 820 in the transmission group 801. The signal 802 comprises information about a feedback 803 to be received from at least one of the UEs 810, 820 in the transmission group 801. The feedback 803 comprises information about the UEs 810, 820 in the transmission group 801, e.g. as described above with respect to FIGS. 1 to 7.

A configuration of the base station with respect to a UE may include command messages from the base station to the UE, wherein the command messages include configuration commands for the UE. The configuration may be performed based on knowledge of the base station and/or feedback messages from the UE and/or other UEs.

The base station 101 may configure the transmission group 801 with respect to sidelink feedback 804 for beamformed or non-beamformed transmission from non-lead UEs 810 of the transmission group 801 to a lead UE 820 of the transmission group 801. The base station 101 may configure the transmission group 801 based on information provided by at least one UE of the transmission group 801.

The base station 101 may select the lead UE 820 of the transmission group 801 and/or receive information about the lead UE 820 from at least one UE in the transmission group 801, e.g. as described above with respect to FIG. 3. The base station 101 may select the lead UE 820 based on a quality of an uplink connection from the lead UE 820 to the base station 101. The base station 101 may select the lead UE 820 based on at least one of the following options: a decision of the base station 101, in particular wherein the decision is based on channel conditions to the UEs 810, 820 of the transmission group 801; a cooperative agreement of the UEs 810, 820 of the transmission group 801; context information and/or reuse of existing concepts, in particular concepts from platooning use case where a UE 226 of a first vehicle is the lead UE 820, e.g. as described above with respect to FIG. 2.

The base station 101 may form a common beam 104 covering the UEs 110, 120, 130, 140, 150 of the transmission group 801 and/or separate beams for at least two UEs 810, 820 in the transmission group 801.

The base station 101 may configure the transmission group 801 based on channel conditions between at least two UEs 810, 820 of the transmission group 801 and/or based on channel conditions from the base station 101 to at least one UE of the transmission group 801.

The base station 101 may configure the transmission group 801 based on an ability of at least two UEs 810, 820 to communicate with each other, in particular based on reliability, throughput, path loss, fading and/or channel state information, CSI.

The base station 101 may re-configure the transmission group 801 by: splitting the transmission group 801 into two or more sub-groups, or merging the transmission group 801 with at least one other transmission group or with at least one other UE.

The base station 101 may re-configure the transmission group 801 based on changed channel conditions, in particular changed channel quality index, CQI, changed reference signal received power, RSRP, and/or changed beam index or based on predictive communication information.

The base station 101 may assign to the UEs 810, 820 of the transmission group 801: non-interfering resources 211 for orthogonal transmission 210 via the sidelink (804), overlapping resources 221 for non-orthogonal transmission 220 via the sidelink 804 and/or resources providing multi-hop transmission 230 via the sidelink 804, e.g. as described above with respect to FIG. 2.

The base station 101 may configure the lead UE 820 of the transmission group 801 for aggregated group feedback 401, 501 or for non-aggregated group feedback 402, 502, e.g. as described above with respect to FIGS. 4 and 5.

The group feedback may comprises at least one of the following: channel state information, CSI, channel quality indicator, CQI, reference signal received power, RSRP, reference signal received quality, RSRQ, beam index, CSI reference signal resource index, CRI, synchronization signal/physical broadcast channel block, SSB, index, precoding matrix identifier, PMI, rank identifier, RI, and V2X specific information comprising: speed, direction, size of group, UE positions and/or inter-vehicle distances.

The base station 101 may determine a block error rate, BLER, and/or a packet reception ratio, PRR, for the transmission group 801. The base station 101 may provide a group BLER over all UEs 810, 820 of the transmission group 801 that satisfies an overall target BLER and/or UE-specific target BLERs.

The base station 101 may provide the group BLER based on: signaling the overall target BLER to the UEs 810, 820 of the transmission group 801 and receiving from the lead UE 820 a report of a target group modulation and/or a coding set, MCS, of the transmission group 801. Alternatively, the base station 101 may provide the BLER based on signaling the overall target BLER to the UEs 810, 820 of the transmission group 801, receiving from the lead UE 820 a report of channel quality indicators, CQIs, of the UEs 810, 820 of the transmission group 801 and determining the target group MCS based on the reported CQIs.

The aggregated group feedback may be based on feeding back a weighted mean, a normal mean, a maximum, a minimum and/or a median of a CQI, an RSRP or an RSRQ of all UEs 810, 820 of the transmission group 801.

The aggregated group feedback may be based on feeding back a differential group CQI, RSRP and/or RSRQ which is based on a predefined or configured reference.

The non-aggregated group feedback may be based on feeding back: an associated beam index, CRI index and/or SSB index for a reported CQI, RSRP and/or RSRQ; or a CQI, RSRP and/or RSRQ for which a predefined or configured relationship to a beam index, CRI index and/or SSB index exists.

The non-aggregated group feedback may be based on differential CQI, RSRP and/or RSRQ based reporting for CQI, RSRP and/or RSRQ of the other UE's of the transmission group. The non-aggregated group feedback may be based on concatenating the CQI, RSRP and/or RSRQ of the UE's 810, 820 of the transmission group 801 according to a CRI index or beam index order or according to an order configured by signaling.

The base station 101 may coordinate the group feedback for beamformed or non-beamformed transmission with other base stations 102, 103, in particular other gNBs via Xn interface 720, 721, e.g. as described above with respect to FIG. 7. The base station 101 may predict resource requirements based on group feedback received from at least one of the other base stations 102, 103. The base station 101 may coordinate the group feedback with the other base stations 102, 103 based on CQI reports and/or metric reports from one or more UEs 810, 820 of the transmission group 801, e.g. as described above with respect to FIG. 7.

The User Equipment 820 receives a signal 802 from the base station, e.g. gNB. The signal 802 comprises information about a feedback 803 to be reported to the base station 101 from at least one of the UE 820 or another UE 810 in the transmission group 801 which is configured by the base station 101. The transmission group 801 comprises at least two UEs 810, 820 as exemplarily shown in FIG. 8.

The signal 802 may comprise information about a lead UE 820 configuration and/or a non-lead UE 810 configuration. The signal 802 may comprises information about a sidelink feedback 804 for beamformed or non-beamformed transmission to be sent to the base station 101 from non-lead UEs 810 of the transmission group 801 to the lead UE 820 of the transmission group 801.

The UE 820 may transmit information about the lead UE 820 of the transmission group 801 to the base station 101.

The information from the base station 101 about the feedback 803 may be based on sidelink 804 channel conditions between the UEs 810, 820 of the transmission group 801 and based on uplink channel conditions from the UEs 810, 820 of the transmission group 801 to the base station 101.

The UE 820 may report the feedback 803 to the base station 101 based on aggregated group feedback 401, 501 or based on non-aggregated group feedback 402, 502, e.g. as described above with respect to FIGS. 4 and 5.

The feedback may comprise CQI reports and/or metric reports from the UE 820 with the base station 101 or with other base stations 102, 103, e.g. as described above with respect to FIG. 7.

Figure 9:
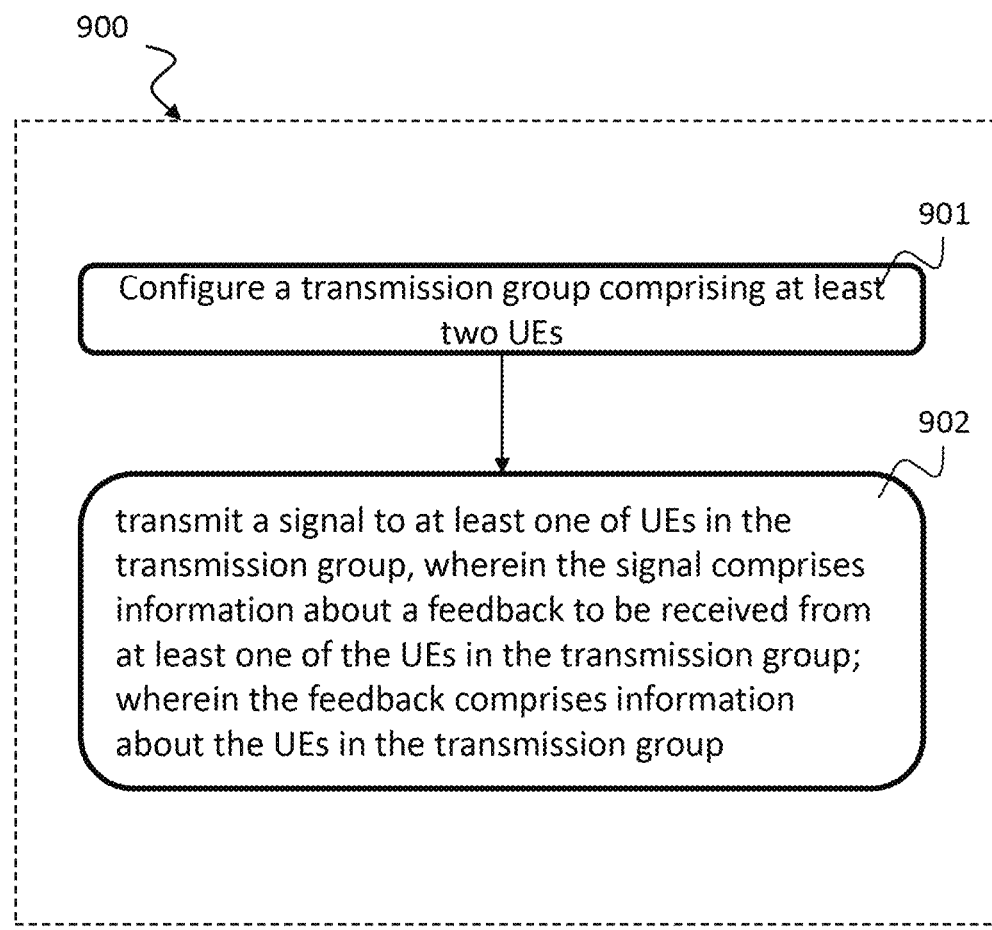
FIG. 9 shows a schematic diagram illustrating a method 900 for group-based feedback transmission according to the disclosure.

FIG. 9 shows a schematic diagram illustrating a method 900 for group-based feedback transmission according to the disclosure.

The method 900 includes: configuring a transmission group comprising at least two User Equipments, UEs 810, 820, e.g. as shown in FIG. 8; and transmitting a signal to at least one of UEs in the transmission group, wherein the signal comprises information about a feedback to be received from at least one of the UEs in the transmission group, wherein the feedback comprises information about the UEs in the transmission group, e.g. as described above with respect to FIGS. 1 to 8.

Another method for configuring a UE may include: receiving a signal 802 from the base station, wherein the signal 802 comprises information about a feedback 803 to be reported to the base station 101 from at least one of the UE 820 or another UE 810 in the transmission group 801 configured by the base station 101, wherein the transmission group 801 comprises at least two UEs 810, 820, e.g. as described above with respect to FIGS. 1 to 8.

The present disclosure also provides a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although exemplary aspects have been illustrated and described herein, it will be appreciated by those of ordinary skill in the art that a variety of alternate and/or equivalent implementations may be substituted for the exemplary aspects shown and described without departing from the scope of the present disclosure. This application is intended to cover any adaptations or variations of the exemplary aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the present disclosure may be practiced otherwise than as specifically described herein.

What is claimed is:

1. A base station, the base station comprising:
a processor configured to determine or configure a transmission group comprising at least two user equipments (UEs); and
a transceiver configured to transmit a signal to at least one of the UEs in the transmission group, wherein the signal comprises information about a feedback to be received from at least one of the UEs in the transmission group,
wherein the feedback comprises information about the UEs in the transmission group,
wherein the processor is further configured to configure the lead UE, of the UEs, of the transmission group for aggregated group feedback or for non-aggregated group feedback,
wherein the aggregated group feedback is based on:
feeding back a weighted mean, a normal mean, a maximum, a minimum, or a median of a CQI, an RSRP, or an RSRQ of all of the UEs of the transmission group;
feeding back a differential group CQI, RSRP, or RSRQ, which is based on a predefined or configured reference;
an associated beam index, CRI index, or an SSB index for a reported CQI, RSRP, or RSRQ; or
a CQI, RSRP, or RSRQ for which a predefined or configured relationship to a beam index, CRI index, or SSB index exists, and
wherein the non-aggregated group feedback is based on at least one of the following options:
differential CQI, RSRP, or RSRQ based reporting for CQI, RSRP, or RSRQ of the other ones of the UEs of the transmission group;
concatenating the CQI, RSRP, or RSRQ of the UEs of the transmission group according to a CRI index or beam index order or according to an order configured by signaling.

2. The base station of claim 1, wherein the processor is configured to configure the transmission group based on information provided by at least one of the UEs of the transmission group;
wherein the processor is configured to select a lead UE of the transmission group or receive information about the lead UE from at least one of the UEs in the transmission group, and
wherein the processor selects the lead UE based on at least one of the following options:
a quality of an uplink connection from the lead UE to the base station,
a decision of the base station, or
reuse of existing concepts.

3. The base station of claim 2, wherein the decision of the base stations is based on channel conditions to the at least two UEs of the transmission group.

4. The base station of claim 2, wherein the existing concepts are from a platooning use case.

5. The base station of claim 1, wherein the processor is configured to:

configure the transmission group with respect to sidelink feedback for transmission from non-lead UEs of the transmission group to a lead UE of the transmission group,
wherein the at least two UEs comprise the non-lead UEs and the lead UE.

6. The base station of one of claim 1, wherein the processor is configured to form a common beam covering the UEs of the transmission group or separate beams for at least two of the UEs in the transmission group.

7. The base station of claim 1, wherein the processor is configured to configure the transmission group based on at least one of the following options:
channel conditions between at least two of the UEs of the transmission group or based on channel conditions from the base station to at least one of the UEs of the transmission group; or
an ability of at least two of the UEs to communicate with each other.

8. The base station of claim 1, wherein the processor is configured to assign to the UEs of the transmission group:
non-interfering resources for orthogonal transmission via a sidelink,
overlapping resources for the non-orthogonal transmission via the sidelink, or
resources providing multi-hop transmission via the sidelink.

9. The base station of claim 1, wherein the transmission group information of the feedback comprises at least one of the following:
channel state information (CSI), channel quality indicator (CQI), reference signal received power (RSRP), reference signal received quality (RSRQ), beam index, CSI reference signal resource index, CRI, synchronization signal/physical broadcast channel block (SSB) index, precoding matrix identifier (PMI), rank identifier (RI), or vehicle to everything (V2X) specific information comprising: speed, direction, size of group, UE positions or inter-vehicle distances.

10. The base station of claim 1, wherein the processor is configured to determine a block error rate (BLER), or a packet reception ratio (PRR) for the transmission group.

11. The base station of claim 10, wherein the processor is configured to provide a group BLER over all of the UEs of the transmission group that satisfies an overall target BLER or UE-specific target BLERs.

12. A system comprising: the base station of claim 1; and a user equipment (UE), the user equipment comprising: a memory configured to store computer-executable instructions and a processor configured to execute the instructions, wherein when the instructions are executed by the processor the UE is configured to:
receive the signal from the base station, wherein the signal comprises information about the feedback to be reported to the base station from at least one of the UE or another UE in the transmission group configured by the base station.

13. The system of claim 12,
wherein the signal comprises information about a lead UE configuration or a non-lead UE configuration.

14. The system of claim 13,
wherein the signal comprises information about a sidelink feedback for transmission to be sent to the base station from non-lead UEs of the transmission group to a lead UE of the transmission group, the UEs comprising the non-lead UEs and the lead UE.

15. The system of claim 14, wherein when the instructions are executed by the processor the UE is further configured to:
transmit information about the lead UE of the transmission group to the base station.

16. The system claim 12,
wherein the information from the base station about the feedback is based on sidelink channel conditions between the UEs of the transmission group and based on uplink channel conditions from the UEs of the transmission group to the base station.

17. The system of claim 12, wherein when the instructions are executed by the processor, the UE is configured to report the feedback to the base station based on aggregated group feedback or based on non-aggregated group feedback.

* * * * *